United States Patent
Hong (10) Patent No.: US 10,966,142 B2
(45) Date of Patent: Mar. 30, 2021

(54) METHOD AND DEVICE FOR TRANSMITTING SYSTEM INFORMATION AND BASE STATION

(71) Applicant: BEIJING XIAOMI MOBILE SOFTWARE CO., LTD., Beijing (CN)

(72) Inventor: Wei Hong, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 16/471,570

(22) PCT Filed: Dec. 30, 2016

(86) PCT No.: PCT/CN2016/113869
§ 371 (c)(1),
(2) Date: Jun. 20, 2019

(87) PCT Pub. No.: WO2018/120187
PCT Pub. Date: Jul. 5, 2018

(65) Prior Publication Data
US 2020/0008132 A1 Jan. 2, 2020

(51) Int. Cl.
*H04W 48/10* (2009.01)
*H04W 4/06* (2009.01)
*H04W 28/10* (2009.01)

(52) U.S. Cl.
CPC ........... *H04W 48/10* (2013.01); *H04W 4/06* (2013.01); *H04W 28/10* (2013.01)

(58) Field of Classification Search
None
See application file for complete search history.

(56) References Cited

U.S. PATENT DOCUMENTS

2012/0134295 A1* 5/2012 Li .................. H04W 48/08
370/254
2014/0307621 A1* 10/2014 Frenger ........... H04W 56/0025
370/328

(Continued)

FOREIGN PATENT DOCUMENTS

CN 101227706 A 7/2008
CN 102318409 A 1/2012
(Continued)

OTHER PUBLICATIONS

Huawei, Delivery of "Other SI" in NR, 3GPP TSG-RAN2 Meetting #95 bis, R2-166203, Oct. 14, 2016, description, paragraph 1-2, 6 pages.
International Search Report (including English translation) and Written Opinion issued in PCT/CN2016/113869, dated Sep. 6, 2017, 11 pages.
First Chinese office action (including English translation of CN201680001955.6 dated Feb. 22, 2019, 11 pages.
(Continued)

*Primary Examiner* — Christopher T Wyllie
(74) *Attorney, Agent, or Firm* — Arch & Lake LLP (57) ABSTRACT

A method for transmitting system information. The method may include: determining an information type of system information to be transmitted, wherein the information type is configured to indicate a network device that triggers the system information; transmitting the system information to User Equipment (UE) within the coverage of a base station by broadcasting when the system information is first system information, wherein the first system information is triggered by the base station; and transmitting the system information to the UE by unicasting or broadcasting, wherein the second system information is triggered by the UE.

20 Claims, 3 Drawing Sheets

(56) References Cited

U.S. PATENT DOCUMENTS

| | | | |
|---|---|---|---|
| 2015/0119054 A1* | 4/2015 | Morioka | H04W 48/10 |
| | | | 455/450 |
| 2015/0245282 A1* | 8/2015 | Kim | H04W 48/20 |
| | | | 370/338 |
| 2015/0282157 A1* | 10/2015 | Kim | H04W 48/14 |
| | | | 370/329 |
| 2016/0227472 A1* | 8/2016 | Qiu | H04W 52/0216 |
| 2016/0234735 A1* | 8/2016 | Kubota | H04W 48/14 |
| 2016/0234759 A1* | 8/2016 | Kubota | H04W 48/10 |
| 2017/0251500 A1* | 8/2017 | Agiwal | H04W 48/12 |
| 2017/0311233 A1* | 10/2017 | Du | H04W 36/18 |
| 2018/0254859 A1* | 9/2018 | Islam | H04W 72/0446 |
| 2019/0230713 A1* | 7/2019 | Geng | H04W 48/08 |
| 2019/0274091 A1* | 9/2019 | Tang | H04W 72/1289 |
| 2019/0394708 A1* | 12/2019 | Damnjanovic | H04W 36/00837 |

FOREIGN PATENT DOCUMENTS

| | | |
|---|---|---|
| CN | 102625461 A | 8/2012 |
| CN | 103179513 A | 6/2013 |
| CN | 103534970 A | 1/2014 |
| CN | 103856923 A | 6/2014 |
| CN | 106171011 A | 11/2016 |
| CN | 106714272 A | 5/2017 |
| CN | 106793139 A | 5/2017 |
| WO | 2016130353 A2 | 8/2016 |

OTHER PUBLICATIONS

Second Chinese office action (including English translation) of CN201680001955.6 dated May 13, 2019, 13 pages.

\* cited by examiner

METHOD AND DEVICE FOR TRANSMITTING SYSTEM INFORMATION AND BASE STATION

CROSS REFERENCE TO RELATED APPLICATIONS

This application is a National Stage of International Application No. PCT/CN2016/113869, filed on Dec. 30, 2016, entitled "method and device for transmitting system information and base station," the entire disclosure of which is incorporated herein by reference in its entirety for all purposes.

TECHNICAL FIELD

The present disclosure relates to the field of mobile communication technologies, and in particular, to a method and device for transmitting system information and a base station.

BACKGROUND

In recent years, the mobile communication technology has developed rapidly in order to provide better communication services for UE (User Equipment). In a current communication system, to enable UE to communicate with a base station, the base station needs to transmit system information to the UE, and the system information includes multiple pieces of information for communicating between a UE and a base station, e.g., information for selecting a base station, information for accessing a base station and information for re-selecting a base station.

The base station may transmit the system information by broadcasting, such that all UE within the coverage of the base station may receive the system information from the base station. Further, the UE can communicate with the base station in accordance with the system information.

SUMMARY

In order to overcome the problems in the related art, the embodiments of the present disclosure provide methods and devices for transmitting system information and a base station. The technical solutions are as follows.

In an aspect, there is provided a method for transmitting system information, comprising:

determining an information type of system information to be transmitted, wherein the information type is configured to indicate a network device that triggers the system information;

transmitting the system information to User Equipment (UE) within the coverage of a base station by broadcasting when the system information is first system information, wherein the first system information is triggered by the base station; and transmitting the system information to the UE by unicasting or broadcasting when the system information is second system information, wherein the second system information is triggered by the UE.

In another aspect, there is provided a device for transmitting system information, comprising:

a first determination module configured to determine an information type of system information to be transmitted, wherein the information type is configured to indicate a network device that triggers the system information; and a transmitter configured to transmit the system information to UE within the coverage of a base station by broadcasting when the system information is first system information, wherein the first system information is triggered by the base station, wherein the transmitter is further configured to transmit the system information which is second system information to the UE by unicasting or broadcasting when the system information is second system information, wherein the second system information is triggered by the UE.

In yet another aspect, there is provided a base station, comprising:

a transmitter, a receiver, a memory and a processor connected to the transmitter, the receiver and the memory, wherein the processor is configured to:

determine an information type of system information to be transmitted when the system information needs to be transmitted, wherein the information type is configured to indicate a network device that triggers the system information; transmit the system information to User Equipment (UE) within the coverage of the base station by broadcasting when the system information is first system information, wherein the first system information is triggered by the base station; and transmit the system information to the UE by unicasting or broadcasting when the system information is second system information, wherein the second system information is triggered by the UE.

It is to be understood that both the foregoing general description and the following detailed description are exemplary and explanatory only and are not restrictive of the present disclosure.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The present disclosure will be described in further detail with reference to the accompanying drawings, to present the objects, technical solutions, and advantages of the present disclosure clearer.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

During implementation of the present disclosure, the inventor discovered at least the following problems in the related art.

Although the system information includes more than one piece of information, the base station transmits all of them by broadcasting. However, the UE may not need some piece of information in the system information at present. For example, when the communication between the UE and the base station is in good quality, the information for re-selecting the base station is not needed. As a result, the base station cannot transmit the system information to the UE as required.

Figure 1:
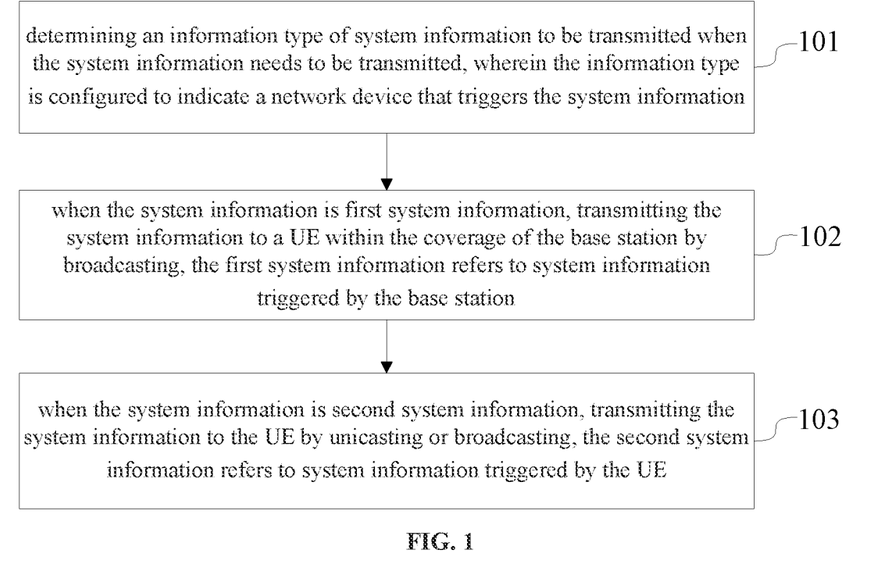
FIG. 1 is a flow chart of a method for transmitting system information according to an exemplary embodiment.

FIG. 1 is a flow chart of a method for transmitting system information according to an exemplary embodiment. As shown in FIG. 1, the embodiment is applied to a base station. The method particularly includes the following steps.

In step 101, determining an information type of system information to be transmitted when the system information needs to be transmitted, wherein the information type is configured to indicate a network device that triggers the system information.

In step 102, when the system information is first system information, transmitting the system information to a UE within the coverage of the base station by broadcasting. The first system information refers to system information triggered by the base station.

In step 103, when the system information is second system information, transmitting the system information to the UE by unicasting or broadcasting. The second system information refers to system information triggered by the UE.

In examples of the present disclosure, the information type of the system information is determined when the system information needs to be transmitted. When the system information is first system information, the system information is transmitted by broadcasting, such that the system information is transmitted to UE within the coverage of the base station. When the system information is the second system information, the system information is transmitted by unicasting or broadcasting, such that the system information is transmitted to UE which triggers the system information. Thus, the system information can be transmitted according to the request from the UE.

In an example, after the information type of the system information to be transmitted is determined when the system information needs to be transmitted, the method further includes the following steps.

A quantity of first information and a quantity of the second information are determined when transmission requests for transmitting specific system information are received from a plurality of UE. The quantity of the first information refers to the quantity of the specific system information transmitted to the plurality of UE by unicasting. The quantity of the second information refers to the quantity of specific system information transmitted to the plurality of UE by broadcasting.

When the quantity of the first information is smaller than the quantity of the second information, the step of transmitting the specific system information to the plurality of UE by unicasting is executed.

In an example, after determining the quantity of the first information and the quantity of the second information, the method further comprises:

transmitting the specific system information to the plurality of UE by broadcasting when the quantity of the first information is greater than or equal to the quantity of the second information.

In an example, the determining the quantity of the first information and the quantity of the second information comprises:

determining the number of the plurality of UE, and multiplying the number of the plurality of UE and a quantity of target information to obtain the quantity of the first information; and determining the number of wave beams for broadcasting the specific system information, and multiplying the number of the wave beams and the quantity of the target information to obtain the quantity of the second information.

The quantity of the target information refers to a quantity of the specific system information carried by one wave beam.

In an example, the first system information includes information for selecting a base station, information for accessing a base station, information for informing an emergency or information for acquiring the second system information. The second system information includes system information other than the first system information.

Any combination of all the above examples may form optional embodiments of the present disclosure, and will not be described one by one herein.

Figure 2:
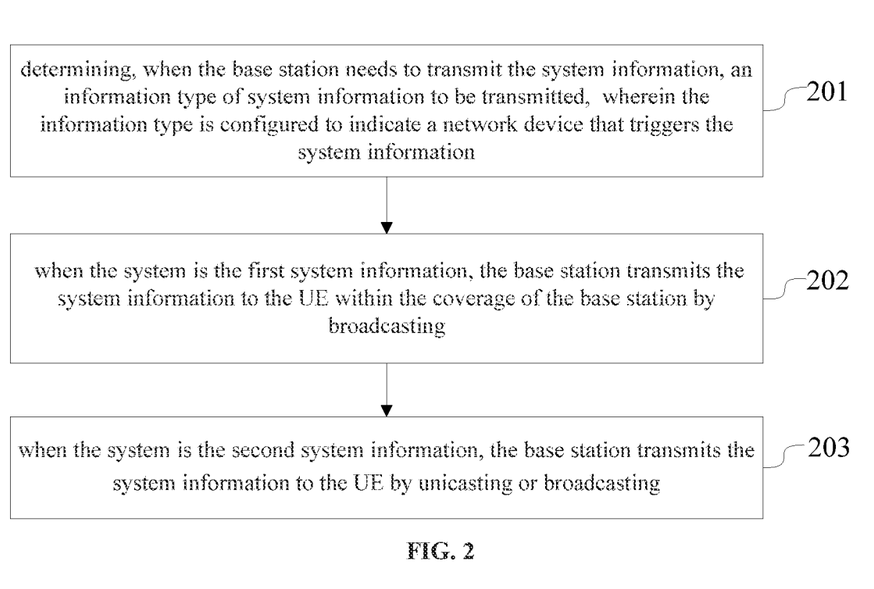
FIG. 2 is a flow chart of a method for transmitting system information according to an exemplary embodiment.

FIG. 2 is a flow chart of a method for transmitting system information according to an exemplary embodiment. As shown in FIG. 2, the embodiment is applied to the base station. The method particularly includes the following steps.

In step 201, determining an information type of system information to be transmitted when the base station needs to transmit the system information, wherein the information type is configured to indicate a network device that triggers the system information.

In this step, the network device refers to a base station or a UE. The first system information refers to system information triggered by the base station. The second system information refers to system information triggered by the UE. In the examples of the present disclosure, the specific information included in the first system information or the second system information is not limited. For example, the first system information includes information for selecting a base station, information for accessing a base station, information for informing an emergency or information for acquiring the second system information. The second system information includes system information other than the first system information. The information for selecting a base station may be, for example, an operating bandwidth. The information for accessing a base station may be, for example, a system frame number. The information for informing an emergency may be, for example, earthquake warning information. The information for acquiring the second system information may be, for example, scheduling information of the second system information. The second system information may include information for re-selecting a base station and interoperation information of different access technologies. The information for re-selecting a base station may be, for example, information of adjacent base stations. The interoperation information of different access technologies may be, for example, information for switching from 5G ($5^{th}$-Generation) network to an LTE (Long Term Evolution) network.

An opportunity in which the system information needs to be transmitted in examples of the present disclosure is not limited. For example, as for the first system information, usually, a transmission cycle of the first system information may be allocated on the base station. Thus, when the transmission cycle is reached, the base station needs to transmit the system information corresponding to the transmission cycle, or when the base station receives an emergency informing instruction triggered by an operator, the base station needs to transmit the system information corresponding to the emergency informing instruction. For another example, as for the second system information, when the base station receives a transmission request sent by UE for transmitting the system information, the base station needs to transmit the system information corresponds to the transmission request.

Thus, when the base station needs to transmit the system information, the network device that triggers the system information can be determined. The system information triggered by the base station may be determined as the first system information. The system information triggered by the UE may be determined as the second system information.

In step 202, transmitting, by the base station, the system information to the UE within the coverage of the base station by broadcasting, when the system is the first system information.

In this step, taking that the system information is the operating bandwidth as an example, when the transmission cycle of the operating bandwidth is reached, the base station can acquire the allocated operating bandwidth, loads the operating bandwidth onto an operating frequency of itself to obtain a carrier wave carrying the operating bandwidth, and transmits the carrier wave to all the UE within the coverage of the base station.

The manner of broadcasting refers to an omnidirectional transmission mode and is not specifically limited in the examples of the present disclosure. For example, the base station may transmit the carrier wave to the UE within the coverage through an omnidirectional antenna by manner of omnidirectional radiation. For another example, the base station may perform multiple beamforming on the carrier wave through an antenna array, such that the wave beams can cover all directions around the base station. Thus, the system information is transmitted to the UE within the coverage of the base station. Beamforming refers to a technology for generating a beam in a direction by adjusting a weighting coefficient of each array element in the antenna array. Besides, in consideration that the 5G network will adopt high-frequency transmission technologies, the path loss is increased. Since the lobes in the beamforming are narrower, the energy is more concentrated. Even in case of high-frequency transmission, the UE farther from the base station can still receive the system information.

In step 203, transmitting, by the base station, the system information to the UE by unicasting or broadcasting, when the system is the second system information.

The unicasting manner refers to a directional transmission mode and is not limited in the examples of the present disclosure. For example, the base station determines, according to a transmission request sent by the UE, location information of the UE for transmitting the system information, and performs beamforming on the carrier wave that carries the system information in accordance with the location information of the UE to form the wave beam that points to the UE. Thus, the system information is directionally transmitted to the UE.

Certainly, the base station may set and indicate the UE an appointed time to receive the transmission request, such that the UE can send the transmission request at the appointed time when the system information is required. Besides, the base station receives the transmission request from the UE at the appointed time. Neither a mode of determining the appointed time nor a mode in which the UE is informed of the appointed time is limited by the examples of the present disclosure. For example, the base station determines a sub-frame with a sub-frame number of 5 in each frame as the appointed time and takes the information at the appointed time as the first system information to be transmitted to the UE within the coverage by broadcasting. Besides, corresponding appointed time can be set for the different specific system information respectively, such that the base station can process the transmission request for transmitting the same system information in a unified manner. For example, the base station determines the sub-frame with the sub-frame number of 5 as appointed time 1 and determines the sub-frame with the sub-frame number of 6 as appointed time 2. The appointed time 1 is set for receiving the transmission request for transmitting the information for re-selecting the base station. The appointed time 2 is for receiving the transmission request for transmitting the interoperation information of the different access technologies.

Under the circumstance of performing transmission by manner of beamforming (for example, a 5G network), to ensure that less transmission resources is taken up while transmitting the system information, the base station may determine a transmission mode for transmitting the system information, the process of determination is described by the following steps (1)-(3) for explanation.

(1) When the base station receives the transmission request for transmitting the specific system information from a plurality of UE, the quantity of the first information and the quantity of the quantity of the second information are determined. The quantity of the first information refers to the quantity of the specific system information transmitted to the plurality of UE by unicasting. The quantity of the second information refers to the quantity of the specific system information transmitted to the plurality of UE by broadcasting.

In step (1), the specific system information refers to any of the second system information. When the base station receives the transmission request for transmitting a piece of specific system information from a plurality of UE (at least two UE), it means that the plurality of UE request the specific system information. At this time, the base station can transmit the specific system information to the plurality of UE by not only broadcasting but also unicasting. To select a transmission mode that is more effective in saving transmission resources, the base station may determine the quantity of the first information and the quantity of the second information, wherein the quantities visually reflect the transmission resources occupied during the transmission. A specific mode in which the quantity of the first information or the quantity of the second information is determined is not limited by the embodiment of the present disclosure. For example, the base station adopts the following determination mode:

The base station determines the number of the plurality of UE, and multiplies the number of the plurality of UE and the quantity of the target information to obtain the quantity of the first information. The base station determines the number of wave beams for broadcasting the specific system information, and multiplies the number of the wave beams and the quantity of the target information to obtain the quantity of the second information. The quantity of the target information refers to a quantity of the specific system information carried by one wave beam.

In this determination mode, the base station can determine the number of the transmission requests for transmitting the piece of specific system information, take the number as the number of the plurality of UE, multiply the number and the quantity of the target information to obtain the quantity of the first information. Besides, the base station can determine the number of wave beams for omnidirectional radiation (360°) through a radiation angle of the wave beam, and multiply the number of the wave beams and the quantity of the target information to obtain the quantity of the second information. It should be noted that the quantities of the target information corresponding to each piece of the specific system information may be different. In addition, the radiation angle of the wave beam is not specifically limited by the embodiment of the disclosure, but it should be smaller than 360°.

Taking that the quantity of the target information of 4 bits, the number of the plurality of UE is 100 and the radiation angle of the wave beam is 30° as an example for explanation, the quantity of the first information is 400 bits, and the quantity of the second information is 48 bits.

After determining the quantity of the first information and the quantity of the second information, the base station can compare the quantity of the first information with the quantity of the second information. Step (2) is executed when the quantity of the first information is smaller than the quantity of the second information. Step (3) is executed when the quantity of the first information is greater than or equal to the quantity of the second information.

(2) The base station executes the step of transmitting the specific system information to the plurality of UE by unicasting when the quantity of the first information is smaller than the quantity of the second information.

In this step, when the quantity of the first information is smaller than the quantity of the second information, it means that more transmission resources are saved when the specific system information is transmitted by unicasting. Thus, the base station performs transmission by unicasting.

(3) The base station transmits the specific system information to the plurality of UE by broadcasting when the quantity of the first information is greater than or equal to the quantity of the second information.

In this step, when the quantity of the first information is greater than or equal to the quantity of the second information, it means that more transmission resources are saved by broadcasting. Thus, the transmission is performed by broadcasting.

It should be noted that when the quantity of the first information is equal to the quantity of the second information, the base station may perform transmission by unicasting, or the base station perform transmission by broadcasting.

In fact, while determining the transmission mode of the system information, to save computing resources of the base station, the base station may also directly compare the number of the plurality of UE with the number of the wave beams. The base station executes the step of transmitting the specific system information to the plurality of UE by unicasting when the number of the plurality of UE is smaller than the number of the waves beams, and transmits the specific system information to the plurality of UE by broadcasting when the number of the plurality of UE is greater than or equal to the number of the wave beams.

In examples of the present disclosure, the information type of the system information is determined when the system information needs to be transmitted. When the system information is first system information, the system information is transmitted by broadcasting, such that the system information is transmitted to the UE within the coverage of the base station. When the system information is second system information, the system information is transmitted by unicasting or broadcasting, such that the system information is transmitted to the UE that triggers the system information. Thus, the system information can be transmitted according to the request from the UE.

Additionally, when the transmission request for transmitting the specific system information is received from the plurality of UE, the quantity of the first information transmitted by unicasting and the quantity of the second information transmitted by broadcasting can be determined. A transmission mode with smaller quantity of information is determined as a transmission mode for transmitting the specific system information to the plurality of UE. Thus, the transmission resources are saved as much as possible.

Moreover, specific modes for determining the quantity of the first information and the quantity of the second information are provided. By determining the number of the plurality of UE and the number of the wave beams for broadcasting the first system information, the number of the plurality of UE and the quantity of the target information are multiplied to obtain the quantity of the first information. The number of the wave beams and the quantity of the target information are multiplied to obtain the quantity of the second information. Thus, the modes in which the quantity of the first information and the quantity of the second information are accurately determined are provided.

Furthermore, respective specific information included in the first system information and the second system information is provided. The first system information may include information for selecting a base station, information for accessing a base station, information for informing an emergency or information for acquiring the second system information, such that the base station can transmit essential information, required for the communication between the UE and the base station, to all UE within the coverage, and immediately inform all the UE in case of emergencies. The second system information includes system information other than the first system information, e.g., information for re-selecting a base station and interoperation information of different access technologies. Since the second system information is applied only in a certain specific communication scene, for example, a scene of re-selecting a base station or switching a network, such that the base station may transmit the system information to the UE that triggers the system information only when the UE needs the system information.

Figure 3:
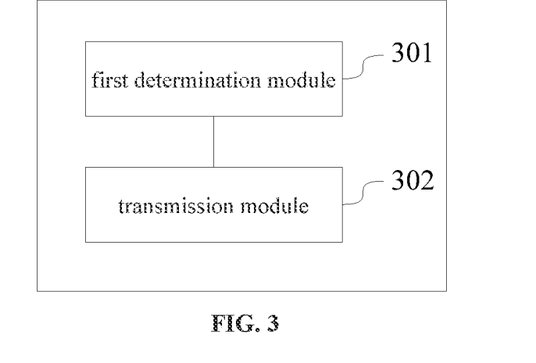
FIG. 3 is a block diagram of a device for transmitting system information according to an exemplary embodiment.

FIG. 3 is a block diagram of a device for transmitting system information according to an example. As shown in FIG. 3, the device includes a first determination module 301 and a transmitter 302.

The first determination module 301 is configured to determine an information type of system information to be transmitted when the system information needs to be transmitted. The information type is configured to indicate a network device that triggers the system information.

The transmitter 302 is configured to transmit the system information to UE within the coverage of a base station by broadcasting when the system information is first system information. The first system information refers to the system information triggered by the base station.

The transmitter 302 is configured to transmit the system information to the UE by unicasting or broadcasting when the system information is second system information. The second system information refers to the system information triggered by the UE.

In examples of the present disclosure, the information type of the system information is determined when the system information needs to be transmitted. The system information is transmitted to the UE by broadcasting when the system information is first system information, such that the system information is transmitted to the UE within the coverage of the base station. The system information is transmitted by unicasting or broadcasting when the system information is second system information, such that the system information is transmitted to the UE that triggers the system information; thus, the system information can be transmitted according to the request from the UE.

Figure 4:
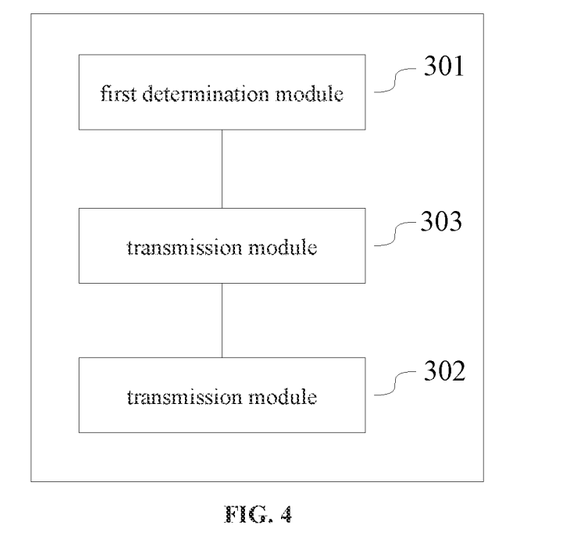
FIG. 4 is a block diagram of a device for transmitting system information according to an exemplary embodiment.

In an example, referring to FIG. 4 for the composition of the device based on FIG. 3, the device further includes a second determination module 303.

The second determination module 303 is configured to determine a quantity of the first information and a quantity of the second information when transmission requests for transmitting specific system information are received from a plurality of UE. The quantity of the first information refers to the quantity of the specific system information transmitted to the plurality of UE by unicasting. The quantity of the second information refers to the quantity of the specific system information transmitted to the plurality of UE by broadcasting.

The transmitter 302 is configured to execute the step of transmitting the specific system information to the plurality of UE by unicasting when the quantity of the first information is smaller than the quantity of the second information.

In an example, the transmitter 302 is further configured to transmit the specific system information to the plurality of UE by broadcasting when the quantity of the first information is greater than or equal to the second information.

In an example, the second determination module 303 is configured to: determine the number of the plurality of UE, and multiply the number of the plurality of UE and quantity of a target information to obtain the quantity of the first information, and determine the number of wave beams required for broadcasting the specific system information, and multiply the number of the wave beams and the quantity of the target information to obtain the quantity of the second information. The quantity of a target information refers to a quantity of the specific system information carried by one wave beam.

In an example, the first system information includes information for selecting a base station, information for accessing a base station, information for informing an emergency or information for acquiring the second system information. The second system information includes system information other than the first system information.

Any combination of all the above optional examples may form optional embodiments of the present disclosure, and will not be described one by one herein.

Figure 5:
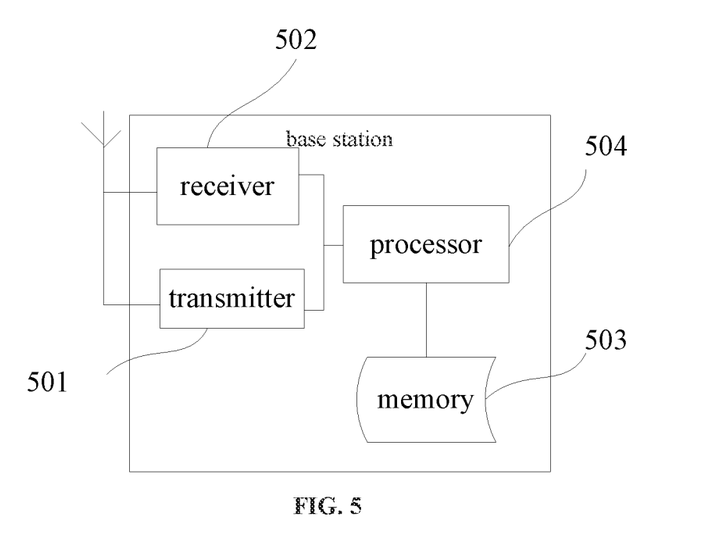
FIG. 5 is a structural schematic view of a base station according to an exemplary embodiment.

FIG. 5 is a structural schematic view of a base station according to an example. As shown in FIG. 5, the base station includes a transmitter 501, a receiver 502, a memory 503 and a processor 504 connected to the transmitter 501, the receiver 502 and the memory 503. Certainly, the base station may further include universal parts, e.g., an antenna, a baseband processing part, an intermediate-frequency processing part and an input/output device, which will not be limited by the embodiment of the present disclosure. The processor 504 is configured to execute the method in any example provided by the disclosure.

The foregoing descriptions are merely preferred examples of the present disclosure, and are not intended to limit the present disclosure. Within the spirit and principles of the disclosure, any modifications, equivalent substitutions, improvements, etc., are within the scope of protection of the present disclosure.

Other examples of the present disclosure can be available to those skilled in the art upon consideration of the specification and practice of the invention disclosed herein. The present invention is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A method for transmitting system information, comprising:
   determining an information type of system information to be transmitted, wherein the information type is configured to indicate a network device that triggers the system information;
   transmitting the system information to User Equipment (UE) within a coverage of a base station by broadcasting when the system information is first system information, wherein the first system information is triggered by the base station; and
   transmitting the system information to the UE by unicasting or broadcasting when the system information is second system information, wherein the second system information is triggered by the UE,
   wherein after determining the information type of the system information to be transmitted, the method further comprises:
      determining a first quantity of the first information and a second quantity of the second information when transmission requests for transmitting a piece of specific system information are received from a plurality of UE, wherein the first quantity of the first information refers to a quantity of the specific system information transmitted to the plurality of UE by unicasting, and the second quantity of the second information refers to a quantity of the specific system information transmitted to the plurality of UE by broadcasting; and
      executing the step of transmitting the specific system information to the plurality of UE by unicasting when the first quantity of the first information is smaller than the second quantity of the second information.

2. The method according to claim 1, after determining the first quantity of the first information and the second quantity of the second information, further comprising:
   transmitting the specific system information to the plurality of UE by broadcasting when the first quantity of the first information is greater than or equal to the second quantity of the second information.

3. The method according to claim 1, wherein the first system information includes information for selecting the base station, information for accessing the base station, information for informing an emergency, or information for acquiring the second system information, and
wherein the second system information comprises system information other than the first system information.

4. The method according to claim 1, wherein the first quantity of the first information and the second quantity of the second information are configured to reflect transmission resources occupied during the transmission of the specific system information.

5. The method according to claim 1, wherein the specific system information refers to any of the second system information.

6. The method according to claim 1, wherein the determining the first quantity of the first information and the second quantity of the second information comprises:
determining a number of the plurality of UE, and multiplying the number of the plurality of UE and a quantity of target information to obtain the first quantity of the first information; and
determining a number of wave beams for broadcasting the specific system information, and multiplying the number of the wave beams and the quantity of the target information to obtain the second quantity of the second information,
the quantity of the target information refers to a quantity of the specific system information carried by one wave beam.

7. The method according to claim 6, wherein determining the number of the plurality of UE comprises:
determining a number of the transmission requests for transmitting the piece of specific system information;
taking the number of the transmission requests for transmitting the piece of specific system information as the number of the plurality of UE.

8. The method according to claim 6, wherein determining the number of wave beams comprises:
determining the number of wave beams for omnidirectional radiation through a radiation angle of the wave beams.

9. A device for transmitting system information, comprising:
a first determination module configured to determine an information type of system information to be transmitted, wherein the information type is configured to indicate a network device that triggers the system information; and
a transmitter configured to transmit the system information to User Equipment (UE) within a coverage of a base station by broadcasting when the system information is first system information, wherein the first system information is triggered by the base station, wherein
the transmitter is further configured to transmit the system information which is second system information to the UE by unicasting or broadcasting when the system information is second system information, wherein the second system information is triggered by the UE,
wherein the device further comprises a second determination module, wherein
the second determination module is configured to determine a first quantity of the first information and a second quantity of the second information when transmission requests for transmitting a piece of specific system information are received from a plurality of UE, wherein the first quantity of the first information means the quantity of the specific system information transmitted to the plurality of UE by unicasting, and the second quantity of the second information refers to the quantity of the specific system information transmitted to the plurality of UE by broadcasting; and
the transmitter is further configured to execute the step of transmitting the specific system information to the plurality of UE by unicasting when the first quantity of the first information is smaller than the second quantity of the second information.

10. The device according to claim 9, wherein
the transmitter is further configured to transmit the specific system information to the plurality of UE by broadcasting when the first quantity of the first information is greater than or equal to the second quantity of the second information.

11. The device according to claim 9, wherein the second determination module is configured to:
determine a number of the plurality of UE, and multiply the number of the plurality of UE and a quantity of target information to obtain the first quantity of the first information; and
determine a number of wave beams for broadcasting the specific system information, and multiply the number of the wave beams and the quantity of the target information to obtain the second quantity of the second information,
the quantity of the target information refers to the quantity of the specific system information carried by one wave beam.

12. The device according to claim 11, wherein the second determination module is configured to:
determine a number of the transmission requests for transmitting the piece of specific system information;
take the number of the transmission requests for transmitting the piece of specific system information as the number of the plurality of UE.

13. The device according to claim 11, wherein the second determination module is configured to:
determine the number of wave beams for omnidirectional radiation through a radiation angle of the wave beams.

14. The device according to claim 9, wherein the first system information comprises information for selecting the base station, information for accessing the base station, information for informing an emergency, or information for acquiring the second system information, and
wherein the second system information comprises system information other than the first system information.

15. The device according to claim 9, wherein the first quantity of the first information and the second quantity of the second information are configured to reflect transmission resources occupied during the transmission of the specific system information.

16. The device according to claim 9, wherein the specific system information refers to any of the second system information.

17. A base station, comprising:
a transmitter, a receiver, a memory and a processor connected to the transmitter, the receiver and the memory, wherein
the processor is configured to:
determine an information type of system information to be transmitted, wherein the information type is configured to indicate a network device that triggers the system information; transmit the system information to User Equipment (UE) within a coverage of the base station by broadcasting when the system information is first system information, wherein the first system information is triggered by the base station; and transmit the system information to the UE by unicasting or broadcasting when the system information is second system information, wherein the second system information is triggered by the UE, wherein the processor is further configured to:

determine a first quantity of the first information and a second quantity of the second information when transmission requests for transmitting a piece of specific system information are received from a plurality of UE, wherein the first quantity of the first information means the quantity of the specific system information transmitted to the plurality of UE by unicasting, and the second quantity of the second information refers to the quantity of the specific system information transmitted to the plurality of UE by broadcasting; and execute the step of transmitting the specific system information to the plurality of UE by unicasting when the first quantity of the first information is smaller than the second quantity of the second information.

18. The base station according to claim 17, wherein the processor is further configured to:

transmit the specific system information to the plurality of UE by broadcasting when the first quantity of the first information is greater than or equal to the second quantity of the second information.

19. The device according to claim 17, wherein the processor is further configured to:

determine a number of the plurality of UE, and multiply the number of the plurality of UE and a quantity of target information to obtain the first quantity of the first information; and determine a number of wave beams for broadcasting the specific system information, and multiply the number of the wave beams and the quantity of the target information to obtain the second quantity of the second information, wherein the quantity of the target information refers to the quantity of the specific system information carried by one wave beam.

20. The device according to claim 17, wherein the first system information comprises information for selecting the base station, information for accessing the base station, information for informing an emergency, or information for acquiring the second system information, and wherein the second system information comprises system information other than the first system information.

* * * * *